United States Patent [19]

Devine

[11] Patent Number: 5,271,785
[45] Date of Patent: Dec. 21, 1993

[54] METHOD OF INSERTING AN INSERT IN AN OPENING OF A PLASTIC PART

[75] Inventor: Stephen E. Devine, New Durham, N.H.

[73] Assignee: Davidson Textron Inc., Dover, N.H.

[21] Appl. No.: 867,426

[22] Filed: Apr. 13, 1992

[51] Int. Cl.⁵ .............................................. B29C 65/08
[52] U.S. Cl. ............................................ 156/73.2; 156/92; 156/293; 156/303.1
[58] Field of Search ..................... 156/73.1, 73.2, 92, 156/295, 303.1, 293, 94; 264/249; 411/82, 258, 908, 903; 52/404, 407; 29/402.11, 402.12, 402.15

[56] References Cited

U.S. PATENT DOCUMENTS

| | | | |
|---|---|---|---|
| 3,184,353 | 5/1965 | Balamuth et al. | 156/303.1 |
| 3,417,653 | 12/1968 | Staats et al. | 411/69 |
| 3,440,117 | 4/1969 | Soloff et al. | 156/73 |
| 3,477,337 | 11/1969 | Racki | 411/903 |
| 3,483,611 | 2/1969 | Balamuth et al. | 29/509 |
| 3,683,470 | 8/1972 | McMaster et al. | 156/303.1 |
| 3,897,713 | 8/1975 | Gugle | 156/303.1 |
| 3,998,824 | 12/1976 | Otsuki et al. | 156/303.1 |
| 4,106,962 | 8/1978 | Adams et al. | 156/73.1 |
| 4,674,257 | 6/1987 | Rose | 411/908 |

FOREIGN PATENT DOCUMENTS

| | | | |
|---|---|---|---|
| 19851 | 2/1977 | Japan | 411/258 |
| 37654 | 3/1977 | Japan | 411/258 |

OTHER PUBLICATIONS

*A Guide to Ultrasonic Plastics Assembly*, 1973, pp. 4–9, 38–41.

Primary Examiner—Michael W. Ball
Assistant Examiner—Steven D. Maki
Attorney, Agent, or Firm—Reising, Ethington, Barnard, Perry & Milton

[57] ABSTRACT

The method for inserting a screw or insert having a barbed or other irregular surface or barbed type insert includes the steps of providing a tool having an ultrasonic horn and a cavity for an insert; filling the cavity with plastic filler material and positioning the insert against the center of the filler material; thereafter, activating the horn to vibrate the insert to soften and penetrate the insert into the opening.

4 Claims, 1 Drawing Sheet

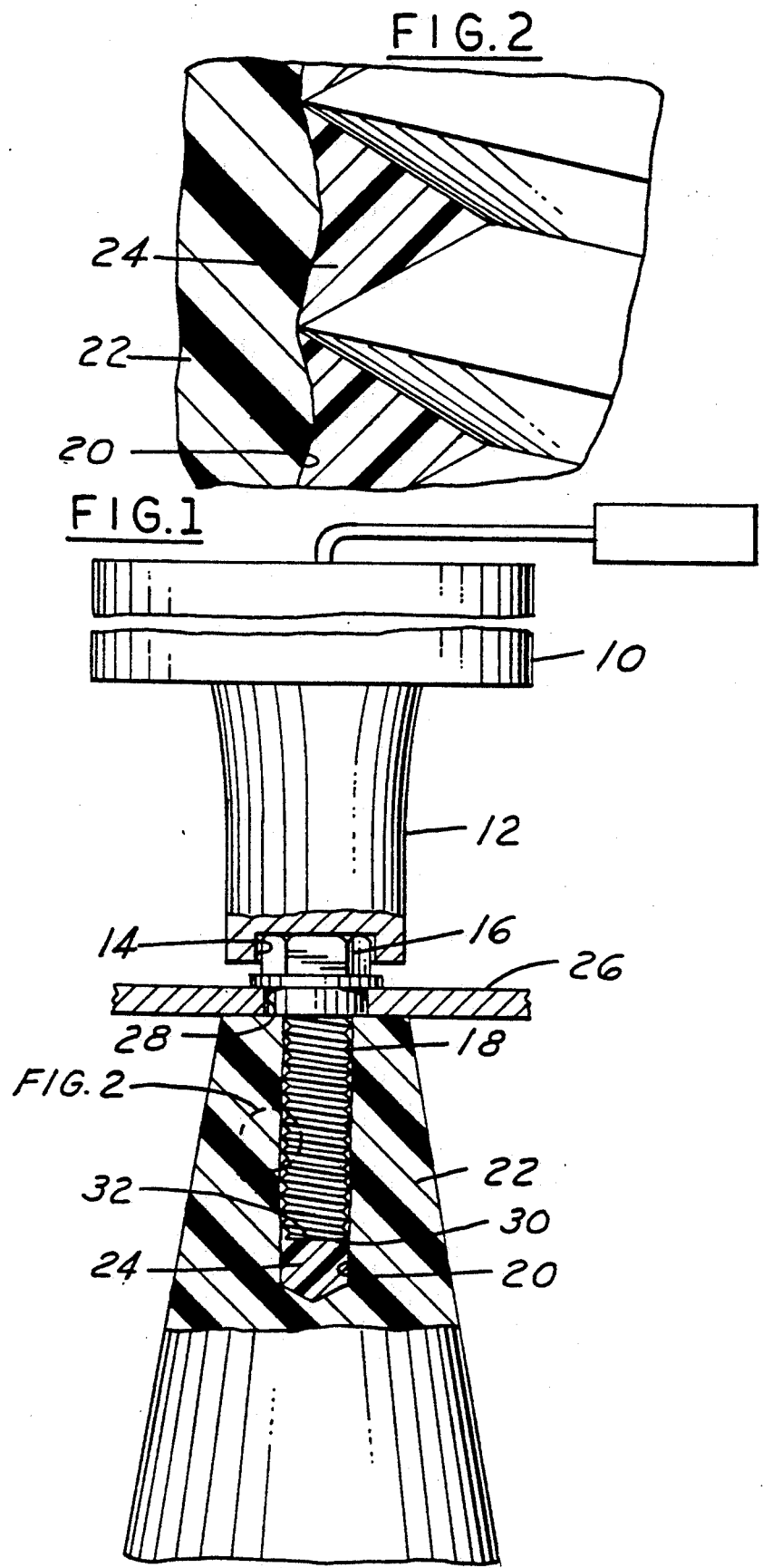

METHOD OF INSERTING AN INSERT IN AN OPENING OF A PLASTIC PART

Balamuth U.S. Pat. No. 3,483,611 discloses the heading or staking of the portion of a rivet-like element extended through an aperture in a second element by subjecting same to high frequency vibratory energy, so as to cause the extended portion to overlap the edges of the aperture and thereby permanently join the two elements together.

Soloff et al U.S. Pat. No. 3,440,117 discloses an ultrasonic method of inserting pins or other fastening elements into a thermoplastic block by applying the ultrasonic energy to the thermoplastic block and urging same onto the pins or other elements, thus causing the block to soften so that the pins penetrate same. No predrilling is required, although a small pilot hole may be provided. Such holes have been found particularly effective when driving plastic elements.

DISCLOSURE OF THE INVENTION

A general object of the invention is to provide an improved method of driving an insert into a new opening or a previously stripped opening in a thermoplastic part.

Another object of the invention is to provide a method of driving an insert into a new drilled or molded opening or a previously stripped opening in a thermoplastic part by first filling the opening with a plastic filler material, urging the insert end against the filler material by adapting the distal end of the horn to receive the insert head and vibrating same to thereby soften the filler material while the insert penetrates same, with the filler material thereafter flowing around any insert threads or barbs to secure same.

These and other objects of the invention will become more apparent when reference is made to the following drawings and the accompanying description.

BRIEF DESCRIPTION OF THE DRAWING

FIG. 1 is a cross-sectional view of an ultrasonic horn, a thermoplastic part, and a screw adapted to being inserted through a part to be assembled, and into the thermoplastic part in accordance with the invention method; and FIG. 2 is an enlarged fragmentary portion of the FIG. 1 structure.

BEST MODE OF CARRYING OUT THE INVENTION

Referring now to the drawings in greater detail, FIG. 1 illustrates an ultrasonic tool 10 receiving alternating current energy from a generator 11, and having a horn 12 with a recess 14 formed in the distal end thereof suitable for receiving the head 16 of an insert 18, such as a screw, for example.

Either a new pilot hole 20 is formed in a first part, such as a thermoplastic part, represented at 22, or the part 22 contains a previously stripped hole. A plastic filler material 24 is inserted in the hole 20 or the hole previously stripped hole becoming bonded to the surrounding plastic material.

A second part 26 (FIG. 1) which is to be secured to the first part 22, includes an opening 28 formed therethrough.

The horn 12 is activated so as to direct its high frequency energy against the head 16 of the insert 18, with the leading end 30 of the insert positioned through the opening 28 against the center of the exposed surface 32 of the filler material 24. The resultant vibration to which the insert 18 is subjected causes the filler material 24 to become softened such that the insert penetrates same until the second part 26 is tightly clamped against the first part 22.

The insert 18 achieves a tight fit within the softened filler material 24 by virtue of the latter flowing around any threads or barbs formed on the insert, and quickly hardening therearound (FIG. 2), rather than the normal process of requiring that threads, for example, rotate to cut away plastic in the surfaces of a new hole or stripped hole.

Industrial Applicability

It should be apparent that the invention provides an efficient, fast, and dependable method for inserting an insert in either of a new opening, or a previously stripped opening, in a thermoplastic part.

Two general embodiments of the invention have been shown and described.

The embodiments of the invention in which an exclusive property or privilege is claimed are defined as follows:

1. A method of inserting an insert having an irregular outer surface, a first end and a second end in a new opening or a previously stripped opening in a selected plastic part, said method comprising the steps of:
   a. filling the new opening or the previously stripped opening in the selected plastic part with a plastic filler material;
   b. forming a recess in the distal end of a horn of an ultrasonic tool;
   c. placing the first end of the inert in the recess;
   d. positioning the second end of the insert against the exposed surface of the plastic filler material;
   e. activating the horn to vibrate the insert, cause the insert to penetrate the plastic filler material and cause the plastic filler material around the insert to soften while the insert penetrates the plastic filler material;
   f. removing the horn from the insert; and
   g. allowing the softened plastic filler material to cool and harden around the irregular outer surface wherein the plastic filler material bonds to the selected plastic part.

2. The method described in claim 1, wherein said insert has threads and said threads form said irregular outer surface.

3. The method described in claim 1, wherein said said insert has barbs and said barbs form said irregular outer surface.

4. The method described in claim 1, further comprising the steps of passing said insert through an opening in a second part and securing said second part to said plastic part with said insert.

* * * * *